United States Patent
Furuya et al.

(10) Patent No.: US 12,305,257 B2
(45) Date of Patent: May 20, 2025

(54) COLD ROLLED STEEL SHEET

(71) Applicant: JFE STEEL CORPORATION, Tokyo (JP)

(72) Inventors: Shinichi Furuya, Tokyo (JP); Takeshi Matsuda, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 478 days.

(21) Appl. No.: 17/905,940

(22) PCT Filed: Mar. 9, 2021

(86) PCT No.: PCT/JP2021/009376
§ 371 (c)(1),
(2) Date: Sep. 9, 2022

(87) PCT Pub. No.: WO2021/187253
PCT Pub. Date: Sep. 23, 2021

(65) Prior Publication Data
US 2023/0105429 A1 Apr. 6, 2023

(30) Foreign Application Priority Data
Mar. 18, 2020 (JP) .................................. 2020-048063

(51) Int. Cl.
*C21D 9/46* (2006.01)
*B32B 15/082* (2006.01)
(Continued)

(52) U.S. Cl.
CPC .............. *C21D 9/46* (2013.01); *B32B 15/082* (2013.01); *B32B 15/18* (2013.01); *C21D 8/0236* (2013.01);
(Continued)

(58) Field of Classification Search
CPC ...... C21D 9/46; C21D 8/0236; C21D 8/0405; C21D 9/48; C21D 8/0436; C21D 8/0478;
(Continued)

(56) References Cited

U.S. PATENT DOCUMENTS 8,507,416 B2 8/2013 Hatasaki et al.
2003/0211343 A1 11/2003 Kinoshita et al.
(Continued)

FOREIGN PATENT DOCUMENTS

CN 1564853 A 1/2005
JP 2000280400 A 10/2000
(Continued)

OTHER PUBLICATIONS

Oct. 18, 2024, Office Action issued by the Korean Intellectual Property Office in the corresponding Korean Patent Application No. 10-2022-7028539 with English language concise statement of relevance.
(Continued)

*Primary Examiner* — Adil A. Siddiqui
(74) *Attorney, Agent, or Firm* — KENJA IP LAW PC (57) ABSTRACT

Provided is a cold rolled steel sheet with excellent press formability, which contains a binder satisfying specific requirements and wax satisfying specific requirements, and has a layer containing the wax in a specific mass ratio at a specific coating weight.

8 Claims, 2 Drawing Sheets

(51) Int. Cl.
*B32B 15/18* (2006.01)
*C21D 8/02* (2006.01)
*C23C 26/00* (2006.01)

(52) U.S. Cl.
CPC .......... *C23C 26/00* (2013.01); *B32B 2325/00* (2013.01); *B32B 2333/00* (2013.01); *B32B 2391/00* (2013.01)

(58) Field of Classification Search
CPC ..... C21D 8/0284; B32B 15/082; B32B 15/18; B32B 2325/00; B32B 2333/00; B32B 2391/00; B32B 15/08; C23C 26/00; C09D 5/08
See application file for complete search history.

(56) References Cited

U.S. PATENT DOCUMENTS

| | | | |
|---|---|---|---|
| 2004/0249036 A1 | 12/2004 | Higai et al. | |
| 2018/0345317 A1 | 12/2018 | Hirasawa et al. | |

FOREIGN PATENT DOCUMENTS

| | | | |
|---|---|---|---|
| JP | 2001234349 A | 8/2001 | |
| JP | 2002307613 A | 10/2002 | |
| JP | 2005336511 A | 12/2005 | |
| JP | 2006218856 A | 8/2006 | |
| JP | 2008248076 A | 10/2008 | |
| JP | 2010270373 A | 12/2010 | |
| JP | 2011230425 A | 11/2011 | |
| JP | 2017105986 A | 6/2017 | |
| WO | 0160603 A1 | 8/2001 | |
| WO | 2011001653 A1 | 1/2011 | |

OTHER PUBLICATIONS

Jul. 18, 2023, the Extended European Search Report issued by the European Patent Office in the corresponding European Patent Application No. 21771717.2.

Oct. 28, 2023, Office Action issued by the China National Intellectual Property Administration in the corresponding Chinese Patent Application No. 202180020206.9 with English language search report.

Apr. 12, 2024, Office Action issued by the China National Intellectual Property Administration in the corresponding Chinese Patent Application No. 202180020206.9 with English language concise statement of relevance.

May 25, 2021, International Search Report issued in the International Patent Application No. PCT/JP2021/009376.

COLD ROLLED STEEL SHEET

TECHNICAL FIELD

This disclosure relates to a cold rolled steel sheet with improved press formability.

BACKGROUND

Cold rolled steel sheets are used in a wide range of fields, especially in automotive body applications. They are typically subjected to press forming and used in such applications. It has been required, especially in recent years, to form the steel sheet into a more complicated shape to integrate multiple parts and improve design. When the steel sheet is press-formed into such a complicated shape, the surface pressure of the steel sheet tends to increase in some areas, which easily causes steel material fracture and die galling. Therefore, it has been required to further improve the press formability.

Examples of methods of improving the press formability include a method of performing surface treatment on a press mold. The surface treatment on a press mold is widely used, but this treatment has the problem that the press mold cannot be adjusted after the treatment. Further, this treatment increases the costs. Therefore, there is a strong demand for improving the press formability of the steel sheet itself.

On the other hand, there is a method of using high-grade materials with excellent material properties to improve the press formability of the steel sheet itself. However, it is more costly than low-grade materials, and there is a limit to the improvement in press formability depending on the material.

Another method of improving the press formability of the steel sheet itself is to form a layer on the surface of the steel sheet. For example, JP 2010-270373 A (PTL 1) describes a technology for forming a layer on a steel sheet where the layer contains an alkali metal borate as a layer component and a mixture of zinc stearate and wax as a lubricant.

JP 2002-307613 A (PTL 2) describes a technology for forming a layer on a steel sheet where lithium silicate is used as a layer component, and wax and metal soap are added as a lubricant.

JP 2001-234349 A (PTL 3) discloses a technology for forming an alkali soluble organic layer on a steel sheet, where in the alkali soluble organic layer, a lubricant is added to a copolymer containing styrene and a vinyl compound having a carboxyl group copolymerizable therewith as essential monomers.

CITATION LIST

Patent Literature

PTL 1: JP 2010-270373 A
PTL 2: JP 2002-307613 A
PTL 3: JP 2001-234349 A

SUMMARY

Technical Problem

However, the technologies described in PTL 1 and PTL 2 do not sufficiently satisfy the required characteristics regarding press formability, especially deep drawing and stretch forming.

Further, the technology described in PTL 3 may not provide sufficient press formability depending on the type and amount of the lubricant.

It could thus be helpful to provide a steel sheet that is provided with a layer having good lubrication properties and has excellent press formability, together with an advantageous method of manufacturing the same.

Solution to Problem

As a result of intensive studies made to solve the problems of the prior art, we discovered that the problems can be solved by a cold rolled steel sheet that contains a binder satisfying specific requirements and wax satisfying specific requirements, and that has a layer containing the wax in a specific mass ratio at a specific coating weight.

We thus provide the following.

1. A cold rolled steel sheet having a layer on at least one side, wherein
   the layer contains a binder A and natural wax B,
   the binder A is at least one selected from the group consisting of a copolymer of styrene and maleic acid, a copolymer of styrene and maleic anhydride, and a salt of copolymer of styrene and maleic acid,
   the natural wax B is at least one selected from paraffin wax and microcrystalline wax having 20 or more carbon atoms, and the natural wax B has a median size α of 0.2 µm or more and 2.5 µm or less and a melting point β of 100° C. or higher and 115° C. or lower,
   a mass ratio C of the natural wax B, which is defined by the following formula (1), is 20% or more, $$C=\{M_B/(M_A+M_B)\}\times 100 \quad (1)$$

where $M_A$ is an acid anhydride-equivalent mass of the binder (A), and $M_B$ is a mass of the natural wax B, and
   a coating weight D of the layer is 0.5 g/m² or more.
2. The cold rolled steel sheet according to 1., wherein the mass ratio C is 60 mass % or less.
3. The cold rolled steel sheet according to 1. or 2., wherein the coating weight D of the layer is 2.0 g/m² or less.
4. The cold rolled steel sheet according to any one of 1. to 3., wherein the layer contains 70 mass % or more of the binder and the natural wax in total.

Advantageous Effect

According to the present disclosure, it is possible to provide a cold rolled steel sheet with excellent press formability that can be used in a wide range of fields, especially in automotive body applications. By further adding specific requirements to a binder and natural wax, excellent alkali layer-removing performance and weldability can be obtained, thereby providing a cold rolled steel sheet that is ideal as a steel sheet for automobiles. A steel sheet for automobiles needs to be subjected to welding, degreasing, chemical conversion treatment and electrodeposition coating after press forming, and the layer used for the steel sheet for automobiles is also required not to interfere with these subsequent processes. Therefore, it is highly significant to use the steel sheet of the present disclosure.

BRIEF DESCRIPTION OF THE DRAWINGS

In the accompanying drawings.

DETAILED DESCRIPTION

A layer on a cold rolled steel sheet of the present disclosure is the residue of an aqueous agent after heating, where the layer is formed by applying the aqueous agent, partially or completely, to at least one side of the cold rolled steel sheet and heating the aqueous agent to evaporate a solvent. The aqueous agent is an agent in which components forming the layer are mixed with water in a specific ratio, and water is a main solvent.

The pH of the aqueous agent is preferably adjusted to a range of 7 or more and 12 or less and more preferably to a range of 8 or more and 10 or less, and the aqueous agent is applied to at least one side of the steel sheet. When the pH of the aqueous agent is less than 7 and the aqueous agent is acidic, rust may occur on the cold rolled steel sheet during the application of the aqueous agent.

For example, the pH may be measured by adjusting a sample diluted with deionized water so that the mass concentration of the layer components in the aqueous agent is 10% to 25° C., and measuring the pH using a portable pH meter HM-30P (manufactured by DKK-TOA CORPORATION) and a pH composite electrode GST-2739C (manufactured by DKK-TOA CORPORATION) that has been calibrated according to the method specified by the manufacturer. It is preferable to use a neutral phosphate pH standard solution pH 6.86, a borate pH standard solution pH 9.18, and a saturated calcium hydroxide solution pH 12.45 as calibration solutions.

The following explains the details of the layer formed on the steel sheet surface by applying and heating the aqueous agent described above. It is essential that the layer contain a binder A and natural wax B.

(1) About the Binder

A binder in this specification means a compound that prevents wax from falling off from the cold rolled steel sheet. In the layer of the present disclosure, there is a binder around wax particles, and the binder serves as a bridge between the wax particles and the cold rolled steel sheet. In other words, in the layer, the binder evenly distributes and holds the wax particles on the surface of the base steel sheet.

The binder is at least one selected from the group consisting of a copolymer of styrene and maleic acid, a copolymer of styrene and maleic anhydride, and a salt of copolymer of styrene and maleic acid. Two or more of the above may be used in combination.

The reason for selecting styrene as a monomer component of the binder is that it contributes to the improvement of press formability. Further, the reason for selecting maleic acid is that it improves the removability by alkali. The reason for selecting maleic anhydride is the same as that for maleic acid.

In the present disclosure, the same effect can be obtained by selecting any of a copolymer of styrene and maleic acid, a copolymer of styrene and maleic anhydride, and a salt of copolymer of styrene and maleic acid. This is because the binder only needs to hold the wax particles and have excellent removability by alkali, which is not affected by the type of the salt and whether the maleic acid is anhydrous or not.

The copolymer in the present disclosure can be obtained by polymerizing styrene and maleic acid, or styrene and maleic anhydride. The polymerization reaction may be a method using a commonly known copolymerization reaction. The salt of copolymer in the present disclosure may be obtained by neutralizing the polymer. The neutralization method may be any commonly known method.

The salt of copolymer is not particularly limited if it is a salt of a copolymer with a known cation, but a salt with ammonium is most preferable.

The mass average molecular weight of the copolymer is preferably 4000 to 400000, more preferably 6000 to 100000, and still more preferably 9000 to 50000. When the mass average molecular weight of the copolymer is in the range of 4000 to 400000, better press formability and removability by alkali can be obtained, which is advantageous. The weight average molecular weight can be measured by GPC (gel permeation chromatography). For example, it can be measured using a high-speed GPC system HLC-8320GPC (manufactured by Tosoh Corporation), using TSKgel-G as a column, using tetrahydrofuran as an eluate, and using polystyrene as a standard sample.

The monomer sequence of styrene and maleic acid or styrene and maleic anhydride in the copolymer is not particularly limited. That is, the copolymer may be a random copolymer, an alternating copolymer, a block copolymer, or a graft copolymer, but a random copolymer is preferable in consideration of manufacturing cost. The random copolymer in the present disclosure means a copolymer in which constituent units derived from two monomers, i.e., styrene-derived constituent units and maleic acid-derived constituent units or styrene-derived constituent units and maleic anhydride-derived constituent units are irregularly arranged.

In the copolymer of styrene and maleic acid or styrene and maleic anhydride of the present disclosure, the ratio of the constituent units derived from each monomer of styrene and maleic acid or styrene and maleic anhydride (styrene/maleic acid or styrene/maleic anhydride) is not particularly limited, but it is preferably 1/9 or more, more preferably 2/8 or more, and still more preferably 5/5 or more. Further, it is preferably 9/1 or less, more preferably 8/2 or less, and still more preferably 8/2 or less. When the ratio is less than 1/9, the press formability may deteriorate. That is, when the hardness of the layer is insufficient, the layer is easily damaged during pressing, which is undesirable. On the other hand, when the ratio exceeds 9/1, the layer-removing performance (removal of the layer by alkali degreasing) remains at the same level as that of the prior art.

When the copolymer is synthesized by a copolymerization reaction, the molar ratio of each monomer used and the reaction conditions may be appropriately adjusted according to the ratio of the constituent units derived from each monomer in the desired copolymer.

(2) About Natural Wax

The following describes the natural wax used in the present disclosure. The natural wax used in the present disclosure means hydrocarbon that is solid at room temperature and is present in petroleum. Paraffin wax and microcrystalline wax having a carbon number of 20 or more can be suitably used as the natural wax. They produce the same effect when used alone or in a mixture.

Here, the reason why the application of paraffin wax and microcrystalline wax lowers the frictional coefficient of the layer containing the natural wax is not clear with the current analysis technology. However, since paraffin wax and microcrystalline wax are softer than synthetic wax such as polyethylene wax, the reason is considered, for example, that the wax is appropriately deformed by the pressure at the time of pressing.

Further, it is described above that wax other than those mentioned above, such as polyethylene wax (synthetic wax) produced by synthesizing hydrocarbon in petroleum that is liquid at room temperature, does not solve the problem of the present disclosure when used together with the binder.

The natural wax used in the present disclosure has an average particle size (median size: d50) in a range of 0.2 μm or more and 2.5 μm or less. It is preferably 0.3 μm or more. It is preferably 2.0 μm or less, more preferably 1.5 μm or less, and still more preferably 0.7 μm or less. When the average particle size exceeds 2.5 μm, the natural wax falls off from the layer, which does not solve the problem. On the other hand, when the average particle size is less than 0.2 μm, the natural wax is buried in the binder layer, and the natural wax is not exposed on the layer surface. As a result, a press mold cannot contact the natural wax, which does not improve the press formability.

The average particle size (median size) is preferably calculated by dynamic light scattering (DLS). For example, a sample diluted with deionized water to a mass concentration of 300 ppm can be measured by a wet particle size distribution measuring device NANOTRAC UPA-EX150 (manufactured by NIKKISO CO., LTD.). The measurement conditions of the wet particle size distribution measuring device are preferably as follows: set zero time: 60 seconds, measurement time: 180 seconds, number of measurements: 1 time, permeability: permeated, particle refractive index: 1.55, particle shape: non-spherical, solvent: water, solvent refractive index: 1.333, filter: stand: norm, sensitivity: standard.

The melting point β of the natural wax is in a range of 100° C. or higher and 115° C. or lower. It is preferably 102° C. or higher and more preferably 105° C. or higher. Further, it is preferably 113° C. or lower and more preferably 110° C. or lower. The reason is not clear at the current analysis technology, but it is considered as follows. When the melting point β is lower than 100° C., the natural wax melts during the heating process for forming the layer, and the particle size changes. As a result, the frictional coefficient of the layer is not lowered. On the other hand, when the melting point β exceeds 115° C., the frictional coefficient is not lowered because the natural wax does melt due to the heat generated during pressing.

The melting point β of the natural wax used in the present disclosure is a melting point determined in accordance with JIS K2235: 2009, 5.3 "Melting Point Test Method".

Further, it is essential that the mass ratio C of the natural wax (B), which is defined by the following formula (1), be 20% or more. It is preferably 22 mass % or more and more preferably 27 mass % or more.

$$C=\{M_B/(M_A+M_B)\}\times 100 \quad (1)$$

where $M_A$ is an acid anhydride-equivalent mass of the binder (A), and $M_B$ is a mass of the natural wax B When the binder (A) is a copolymer of styrene and maleic anhydride, the actual mass of the copolymer is $M_A$. When the binder (A) is a copolymer of styrene and maleic acid or a salt of copolymer of styrene and maleic acid, the acid anhydride-equivalent mass of these (the maleic anhydride-equivalent mass of the maleic acid or maleic acid salt portion) is taken as $M_A$.

The $M_A$ and $M_B$ are the masses contained in any predetermined amount of the layer.

When the mass ratio C is less than 20 mass %, the press formability is not improved. This is because the wax, which has the effect of lowering the coefficient of friction, is insufficient.

The upper limit of the mass ratio C is not particularly limited. However, from the viewpoint of layer-removing performance (removal of the layer by alkali degreasing), the upper limit is preferably 60 mass %. When the mass ratio C exceeds 60 mass %, the proportion of the binder that is easily removed by alkali degreasing decreases, which may lead to deterioration of layer-removing performance. It is more preferably 35 mass % or less. A ratio of the total of the mass of the binder A (Wa) and the mass of the natural wax B (Wb) to the mass (W) of the lubricating layer ((Wa+Wb)/W, abbreviated as "Rab") is preferably 70 mass % or more (the binder A is acid anhydride-equivalent). When the Rab is less than 70 mass % with respect to 100 mass % of the layer, the press formability is not satisfied even if the molar ratio of styrene to maleic acid in the binder A is 1/9 or more and 9/1 or less.

The following describes a method of determining the mass fraction C in detail.

First, for the binder and the wax, a test piece in which the coating weight after heating can be determined from the content in the aqueous agent and the amount applied on the steel sheet is prepared and used as a calibration plate. Next, the intensity of the infrared absorption spectrum of the surface of the calibration plate after heating is measured by a Fourier transform infrared spectrophotometer (FT-IR measuring device) to create a calibration curve that indicates the relationship between the intensity of the infrared absorption spectrum derived from each of the binder and the natural wax and the amount of residue after heating of each of the binder and the natural wax. In this case, the intensity of the infrared absorption spectrum derived from the binder may be measured using the spectra characteristic of an aromatic group of a styrene-derived constituent unit, an ester group of a maleic acid-derived constituent unit, and a lactone ring portion of a maleic anhydride-derived constituent unit as indicators and also in consideration of the ratio of each constituent unit of the copolymer. The intensity of the infrared absorption spectrum derived from the natural wax may be measured using a spectrum characteristic of a methylene group as an indicator.

Next, a layer according to the present disclosure is formed on a cold rolled steel sheet, the intensity the infrared absorption spectrum is measured, and the coating weight of each of the binder and the natural wax in the layer is calculated with the calibration curve from the intensity of the infrared absorption spectrum derived from the binder and the intensity of the infrared absorption spectrum derived from the natural wax. Using the acid anhydride-equivalent mass $M_A$ of the binder and the mass $M_B$ of the natural wax calculated based on the coating weight obtained by such procedure, the mass ratio C of the residue of the natural wax after heating can be obtained by calculating $\{M_B/(M_A+M_B)\}\times 100$.

In addition to the binder and the natural wax, the layer according to the present disclosure may contain, as optional components, compounds such as a surfactant as a wettability-improving agent or a defoamer to form a uniform layer on the cold rolled steel sheet. There is no problem if the content of such optional components in the layer is less than 30 mass %. The type of the compound is not particularly limited if it is a conventionally known wettability-improving agent or defoamer, and examples thereof include a cationic surfactant, an anionic surfactant, a nonionic surfactant, an alcohol-based organic solvent, a mineral oil-based compound, and a compound containing Si in its structure.

The total content of the binder and the natural wax in the layer is determined as follows.

After measuring the mass of the cold rolled steel sheet with the layer whose intensity of the infrared absorption spectrum has been measured as described above, the layer is removed using an alkaline aqueous solution according to the method described below and the like. Next, the coating weight D of the layer per square meter is calculated using the change in mass of the cold rolled steel sheet before and after the removal of the layer and the area of the cold rolled steel sheet on which the layer is formed. Each mass of MA' and MB' contained in the layer per square meter of the MA and MB calculated using the calibration curve used when calculating the mass ratio C, and the coating weight D described below are used to calculate $\{(MA'+MB')/D\} \times 100$. The result of the calculation is the total content of the binder and the natural wax in the layer.

The method of removing the layer from the cold rolled steel sheet is to immerse the cold rolled steel sheet having the layer in an alkaline aqueous solution. The immersion time is preferably in a range of 30 seconds or more and 120 seconds or less. The temperature of the alkaline aqueous solution during immersion is preferably in a range of 30° C. or higher and 50° C. or lower.

The pH of the alkaline aqueous solution when the layer is removed from the cold rolled steel sheet is preferably in a range of 10 or more and 13 or less. Alkali components in the preparation of the alkaline aqueous solution are not limited, and examples thereof include sodium hydroxide, sodium carbonate, sodium phosphate, and sodium silicate.

The coating weight D of the layer in the present disclosure is 0.5 g/m² or more. It is preferably 0.8 g/m² or more. When the D is less than 0.5 g/m², the press formability is not improved. This is because the coating weight of the layer, which has the effect of lowering the coefficient of friction, is insufficient.

On the other hand, when the D exceeds 2.0 g/m², the conductivity of the layer decreases. As a result, welding defects may occur during resistance spot welding in consideration of using the steel sheet as a steel sheet for automobiles. It is more preferably in a range of 1.5 g/m² or less.

A cold-rolled steel sheet which is a substrate having the layer according to the present disclosure may be any type of cold rolled steel sheet for soft processing ranging from a cold rolled steel sheet for general processing to a cold rolled steel sheet for deep drawing, a cold-rolled steel sheet for high-deep drawing and a cold rolled steel sheet for ultra-deep drawing, and any type of high tensile strength steel sheet ranging from a high tensile strength steel sheet having bake hardenability and a relatively low strength to a common high tensile strength steel sheet having a strength of more than 440 MPa. All of these can be manufactured by commonly known manufacturing methods.

The layer according to the present disclosure is formed by applying the aqueous agent containing the layer components (binder A and natural wax B) to at least one side of a cold rolled steel sheet and heating the aqueous agent to evaporate the solvent. The heating method and the heating temperature are not particularly limited if they can evaporate and remove the water-based solvent contained in the aqueous agent and do not decompose or denature the layer components (binder and natural wax). For example, a heating furnace, an oven, a heater, a hot-air drying furnace or the like can be used to heat until the surface temperature of the sheet reaches 50° C. to 100° C. and preferably 60° C. to 80° C.

The method of applying the aqueous agent may be any known method, which is not particularly limited. Examples thereof include a method of applying the aqueous agent while controlling the coating weight with a bar coater or a roll coater, and a method of applying a large amount of coating solution by spraying or dipping and then controlling the coating weight by squeezing with a roll or the like.

EXAMPLES

The following describes the present disclosure in detail with reference to examples and comparative examples. These examples are intended to exemplify the present disclosure and do not limit the present disclosure in any way.

A cold-rolled steel sheet for deep drawing having a thickness of 0.7 mm was used as a test material.

The steel sheet was subjected to degreasing pretreatment using Fine Cleaner E6403 (manufactured by Nihon Parkerizing Co., Ltd.) as pretreatment to remove oil and dirt from the surface. Next, after washing the test material with tap water and confirming that the test material was 100% wet with water, the test material was heated using an electric oven whose heating temperature was set to 100° C. to obtain a substrate for forming a lubricating layer.

Next, a coating solution, which had been adjusted to have the mass concentration of the layer components (binder and natural wax) listed in Table 1 and the layer composition listed in Table 1, was applied to the substrate with a bar coater so that the steel sheet after heating had the coating weight listed in Table 1, and the sheet was heated to a surface temperature of 80° C. using the electric oven to form a layer on the surface of the steel sheet. The properties such as the types of the binder and the natural wax do not change between the coating solution and the layer.

The frictional coefficient was measured as a method of evaluating the press formability of the steel sheet with the layer obtained by the above procedure, and the sliding properties, that is, the press formability was evaluated. A method of subjecting the steel sheet on which the layer had been formed to alkaline degreasing to determine the layer peeling rate was used as a method of evaluating the layer-removing performance. Further, resistance spot welding was used as a method of evaluating weldability to evaluate the continuous spot weldability.

More specific evaluation methods of press formability (sliding properties), layer-removing performance, and weldability are as follows.

(1) Press Formability (Sliding Properties)

To evaluate the sliding properties, that is, press formability, the frictional coefficient μ of each test material of steel sheet that had been subjected to lubrication treatment was measured as described below.

Figure 1:
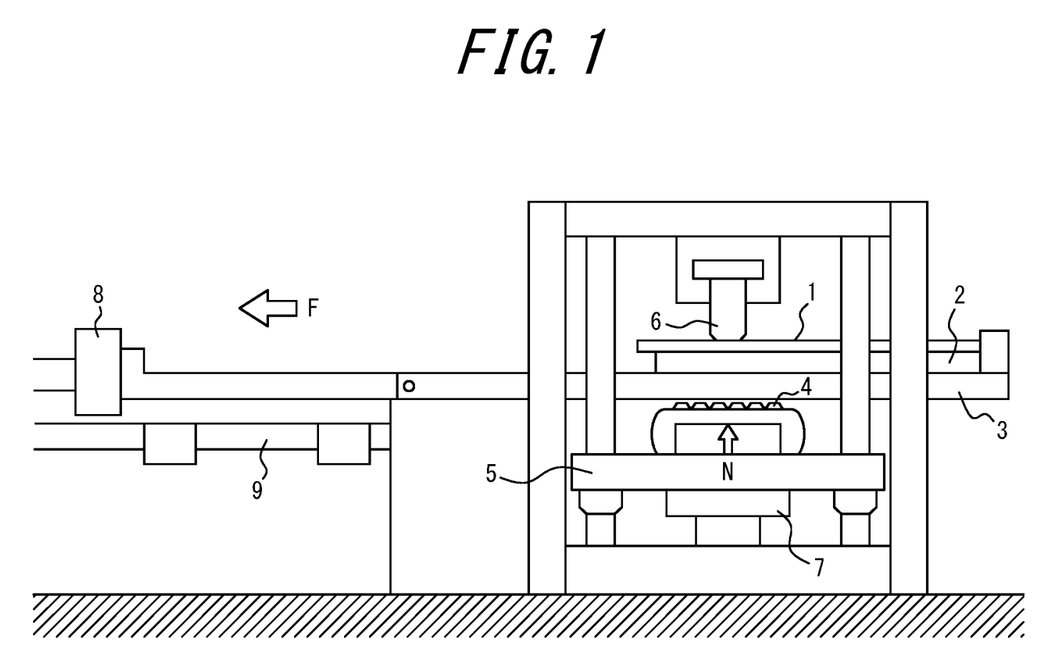
FIG. 1 is a schematic front view of a frictional coefficient tester.

FIG. 1 is a schematic front view of a frictional coefficient tester. A sample 1 for measuring friction coefficient (hereinafter referred to as "sample 1") collected from the test material is fixed on a sample table 2, and the sample table 2 is fixed on the upper surface of a slide table 3 adapted to be slidable in the horizontal direction, as illustrated in FIG. 1. A slide table support 5 having rolls 4 and movable in the vertical direction is provided under the slide table 3 such that the rolls 4 are in contact with the lower surface of the slide table 3. A bead 6 can apply a pressing load N to the sample 1 by pushing up the slide table support 5. A first load cell 7 for measuring the pressing load N is mounted on the slide table support 5. In the tester, the slide table 3 is moved horizontally with the pressing load N applied thereon. A second load cell 8 for measuring the sliding resistance force F in such a case is mounted above a rail 9 at one end of the slide table 3. The surface of the sample 1 was applied with cleansing oil for pressing PRETON R352L manufactured by SUGIMURA Chemical Industrial Co., Ltd. as a lubricating oil, and a test was carried out.

Figure 2:
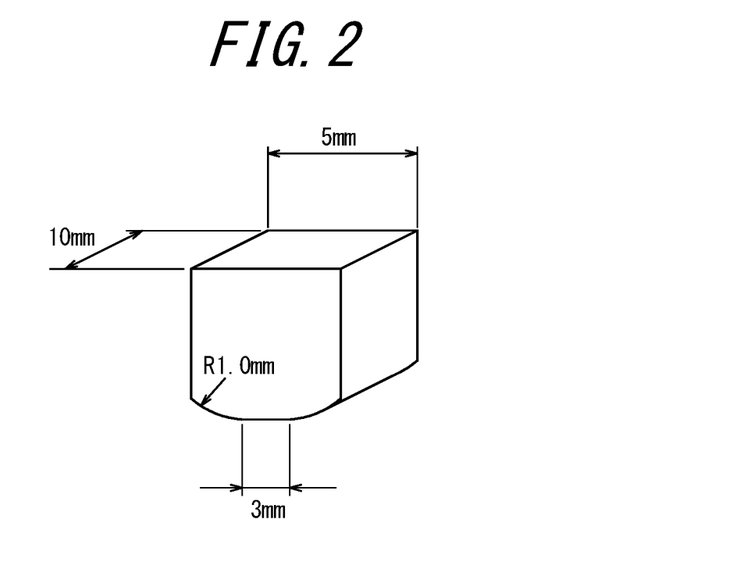
FIG. 2 is a schematic perspective view illustrating the shape and dimension of a bead used in Example.
Figure 3:
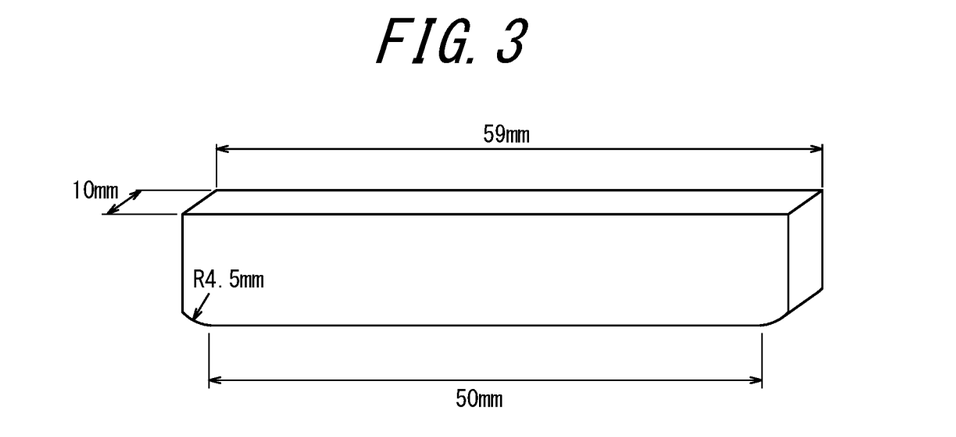
FIG. 3 is a schematic perspective view illustrating the shape and dimension of another bead used in Example.

FIG. 2 and FIG. 3 are schematic perspective views illustrating the shapes and dimensions of beads used in the examples, respectively. A bead having the size illustrated in FIG. 2 or FIG. 3 is used as the bead 6 in FIG. 1 and slides with its lower surface pressed against the surface of the sample 1. The bead illustrated in FIG. 2 has a curved surface having a width (length in the direction perpendicular to the sliding direction) of 10 mm, a length (length in the sliding direction) of 5 mm, and a curvature of 1.0 mmR at the bottom of both ends in the sliding direction. The lower surface of the bead against which the sample 1 is pressed is formed of a flat surface having a width of 10 mm and a length in the sliding direction of 3 mm. The bead illustrated in FIG. 3 has a curved surface having a width of 10 mm, a length in the sliding direction of 59 mm, and a curvature of 4.5 mmR at the bottom of both ends in the sliding direction. The lower surface of the bead against which the sample 1 is pressed is formed of a flat surface having a width of 10 mm and a length in the sliding direction of 50 mm.

A frictional coefficient measurement test was carried out under two conditions described below.

[Condition 1]

Bead illustrated in FIG. 2, Pressing load N: 400 kgf, and Withdrawal rate of sample (Transfer rate of the slide table 3 in the horizontal direction): 100 cm/min.

[Condition 2]

Bead illustrated in FIG. 3, Pressing load N: 400 kgf, and Withdrawal rate of sample (Transfer rate of the slide table 3 in the horizontal direction): 20 cm/min.

The frictional coefficient $\mu$ between the test material and the bead was calculated using the sliding resistance force F and the pressing load N by the formula: $\mu=F/N$. The smaller the frictional coefficient $\mu$ is, the better the press formability can be evaluated. Specifically, judgment was made according to the following criteria.

<Evaluation Criteria>

Good: frictional coefficient $\mu \leq 0.120$ under Condition 1 and frictional coefficient $\mu \leq 0.120$ under Condition 2

Poor: frictional coefficient $\mu > 0.120$ under Condition 1 or frictional coefficient $\mu > 0.120$ under Condition 2

When the evaluation result in this test is "good", the sample passes the test and can be evaluated as having excellent press formability even under high surface pressure conditions or during complex forming.

(2) Layer-Removing Performance

To determine the layer-removing performance of the steel sheet, each test piece was first subjected to degreasing treatment with a mixture of alkaline degreasing solutions Fine Cleaner E6403A and Fine Cleaner E6403B1 (both manufactured by Nihon Parkerizing Co., Ltd.). In the treatment, the test piece was immersed in a degreasing solution having a Fine Cleaner E6403A concentration of 20 g/L, a Fine Cleaner E6403B1 concentration of 12 g/L, and a temperature of 40° C. for a predetermined time and washed with tap water. The surface carbon intensity of the treated test piece was measured using an X-ray fluorescence analyzer, and the layer peeling rate was calculated by the following formula using the measured value and the measured values of the surface carbon intensity before degreasing and the surface carbon intensity of the untreated steel sheet that had been measured in advance.

The layer-removing performance of the steel sheet was evaluated by the following criteria based on the immersion time in the alkaline degreasing solution at which the layer peeling rate reached 98% or more.

<Layer Peeling Rate>

Layer peeling rate (%)=[(carbon intensity before degreasing−carbon intensity after degreasing)/ (carbon intensity before degreasing−carbon intensity of untreated steel sheet)]×100

<Evaluation Criteria>

Good: within 60 seconds

Fair: within 120 seconds

Poor: over 120 seconds (3) Weldability

Each test piece was subjected to a continuous spot weldability test under conditions of DR type Cr—Cu electrodes, pressing force: 150 kgf, energization time: 10 cycles/60 Hz, and welding current: 7.5 kA, and the weldability was evaluated by the number of possible continuous welding spots until no nugget formed. The evaluation criteria are as follows.

<Evaluation Criteria>

Good: 5000 spots or more

Poor: less than 5000 spots

Table 1 lists the composition and the coating weight of the layer to be subjected to the test of the example, respectively.

TABLE 1

| Steel sheet No. | Type of binder A | Ratio of monomer constituent units (styrene/maleic acid or styrene/maleic anhydride) | Natural wax B Type | Particle size $\alpha$ (µm) | Melting point $\beta$ (° C.) | Layer Mass ratio $C(\%) = \{M_B/(M_A + M_B)\} \times 100$ | Coating weight D (g/m²) |
|---|---|---|---|---|---|---|---|
| 1 | A1 | 5/5 | Paraffin wax | 0.5 | 102 | 30 | 1.0 |
| 2 | A1 | 5/5 | Microcrystalline wax | 0.3 | 105 | 22 | 1.0 |
| 3 | A1 | 5/5 | Microcrystalline wax | 0.3 | 105 | 30 | 1.0 |
| 4 | A1 | 5/5 | Microcrystalline wax | 0.3 | 105 | 60 | 1.0 |
| 5 | A1 | 5/5 | Microcrystalline wax | 0.5 | 107 | 22 | 1.0 |
| 6 | A1 | 5/5 | Microcrystalline wax | 0.5 | 107 | 30 | 1.0 |
| 7 | A1 | 5/5 | Microcrystalline wax | 0.5 | 107 | 60 | 1.0 |
| 8 | A1 | 5/5 | Microcrystalline wax | 2.5 | 110 | 22 | 1.0 |
| 9 | A1 | 5/5 | Microcrystalline wax | 2.5 | 110 | 30 | 1.0 |
| 10 | A1 | 5/5 | Microcrystalline wax | 2.5 | 110 | 60 | 1.0 |
| 11 | A1 | 5/5 | Microcrystalline wax | 0.5 | 113 | 22 | 1.0 |
| 12 | A1 | 5/5 | Microcrystalline wax | 0.5 | 113 | 30 | 1.0 |
| 13 | A1 | 5/5 | Microcrystalline wax | 0.5 | 113 | 60 | 1.0 |
| 14 | A1 | 5/5 | Paraffin wax | 0.5 | 102 | 30 | 0.5 |
| 15 | A1 | 5/5 | Paraffin wax | 0.5 | 102 | 30 | 2.0 |
| 16 | A2 | 6/4 | Microcrystalline wax | 0.5 | 113 | 30 | 1.0 |

TABLE 1-continued

| Steel sheet No. | Type of binder A | Ratio of monomer constituent units (styrene/maleic acid or styrene/maleic anhydride) | Natural wax B Type | Particle size α (μm) | Melting point β (° C.) | Layer Mass ratio C(%) = {$M_B$/($M_A + M_B$)} × 100 | Coating weight D (g/m²) |
|---|---|---|---|---|---|---|---|
| 17 | A3 | 7/3 | Paraffin wax | 0.5 | 102 | 30 | 1.0 |
| 18 | A1 | 5/5 | Microcrystalline wax | 0.3 | 105 | 30 | 1.0 |
|    |    |     | Paraffin wax | 0.5 | 102 |    |    |
| 19 | — | — | Microcrystalline wax | 0.3 | 105 | 100 | 1.0 |
| 20 | A1 | 5/5 | — | — | — | 0 | 1.0 |
| 21 | A4 | — | Microcrystalline wax | 0.3 | 105 | 30 | 1.0 |
| 22 | A5 | — | Microcrystalline wax | 0.3 | 105 | 30 | 1.0 |
| 23 | A1 | 5/5 | Polyethylene wax | 0.6 | 113 | 30 | 1.0 |
| 24 | A1 | 5/5 | Microcrystalline wax | 0.15 | 107 | 30 | 1.0 |
| 25 | A1 | 5/5 | Microcrystalline wax | 2.8 | 107 | 30 | 1.0 |
| 26 | A1 | 5/5 | Paraffin wax | 0.5 | 70 | 30 | 1.0 |
| 27 | A1 | 5/5 | Paraffin wax | 0.5 | 120 | 30 | 1.0 |
| 28 | A1 | 5/5 | Microcrystalline wax | 0.3 | 105 | 14 | 1.0 |
| 29 | A1 | 5/5 | Microcrystalline wax | 0.3 | 105 | 65 | 1.0 |
| 30 | A1 | 5/5 | Microcrystalline wax | 0.5 | 113 | 30 | 0.3 |
| 31 | A1 | 5/5 | Microcrystalline wax | 0.5 | 113 | 30 | 2.5 |

The meaning of each indication of binder type in Table 1 is as follows.

A1: copolymer of styrene and maleic anhydride
A2: copolymer of styrene and maleic acid
A3: salt of copolymer of styrene and maleic acid
A4: acrylic resin (without constituent unit derived from styrene, maleic acid, or maleic anhydride)
A5: polyester resin (without constituent unit derived from styrene, maleic acid, or maleic anhydride)

TABLE 2

| Steel sheet No. | Frictional coefficient | Layer removing performance | Weldability | Remarks |
|---|---|---|---|---|
| 1 | Good | Good | Good | Example |
| 2 | Good | Good | Good |  |
| 3 | Good | Good | Good |  |
| 4 | Good | Good | Good |  |
| 5 | Good | Good | Good |  |
| 6 | Good | Good | Good |  |
| 7 | Good | Good | Good |  |
| 8 | Good | Good | Good |  |
| 9 | Good | Good | Good |  |
| 10 | Good | Good | Good |  |
| 11 | Good | Good | Good |  |
| 12 | Good | Good | Good |  |
| 13 | Good | Good | Good |  |
| 14 | Good | Good | Good |  |
| 15 | Good | Good | Good |  |
| 16 | Good | Good | Good |  |
| 17 | Good | Good | Good |  |
| 18 | Good | Good | Good |  |
| 19 | Poor | Poor | Good | Comparative Example |
| 20 | Poor | Good | Good |  |
| 21 | Poor | Good | Good |  |
| 22 | Poor | Poor | Good |  |
| 23 | Poor | Fair | Good |  |
| 24 | Poor | Good | Good |  |
| 25 | Poor | Good | Good |  |
| 26 | Poor | Good | Good |  |
| 27 | Poor | Good | Good |  |
| 28 | Poor | Good | Good |  |
| 29 | Good | Fair | Good | Example |
| 30 | Poor | Good | Good | Comparative Example |
| 31 | Good | Good | Fair | Example |

Table 2 lists the results of the example. The results listed in Table 2 indicate the following. Steel sheets Nos. 1 to 18, 29 and 31 according to the present disclosure have excellent frictional coefficient. On the other hand, steel sheets Nos. 19 to 28 and 30, which are comparative examples that do not satisfy the present disclosure, have inferior frictional coefficient.

INDUSTRIAL APPLICABILITY

The steel sheet of the present disclosure has excellent press formability, so that it can be applied in a wide range of fields, especially in automotive body applications.

REFERENCE SIGNS LIST 1 sample for measuring friction coefficient
2 sample table
3 slide table
4 roll
5 slide table support
6 bead
7 first load cell
8 second load cell
9 rail
N pressing load
F sliding resistance force (withdrawal load)

The invention claimed is:

1. A cold rolled steel sheet having a layer on at least one side, wherein
the layer contains a binder A and natural wax B,
the binder A is at least one selected from the group consisting of a copolymer of styrene and maleic acid, a copolymer of styrene and maleic anhydride, and a salt of copolymer of styrene and maleic acid,
the natural wax B is at least one selected from paraffin wax and microcrystalline wax having 20 or more carbon atoms, and the natural wax B has a median size α of 0.2 μm or more and 2.5 μm or less and a melting point β of 100° C. or higher and 115° C. or lower,
a mass ratio C of the natural wax B, which is defined by the following formula (1), is 20% or more, $$C = \{M_B/(M_A+M_B)\} \times 100 \quad (1)$$

where $M_A$ is an acid anhydride-equivalent mass of the binder (A), and $M_B$ is a mass of the natural wax B, and a coating weight D of the layer is 0.5 g/m² or more.

2. The cold rolled steel sheet according to claim 1, wherein the mass ratio C is 60 mass % or less.

3. The cold rolled steel sheet according to claim 2, wherein the coating weight D of the layer is 2.0 g/m² or less.

4. The cold rolled steel sheet according to claim 3, wherein the layer contains 70 mass % or more of the binder and the natural wax in total.

5. The cold rolled steel sheet according to claim 2, wherein the layer contains 70 mass % or more of the binder and the natural wax in total.

6. The cold rolled steel sheet according to claim 1, wherein the coating weight D of the layer is 2.0 g/m² or less.

7. The cold rolled steel sheet according to claim 6, wherein the layer contains 70 mass % or more of the binder and the natural wax in total.

8. The cold rolled steel sheet according to claim 1, wherein the layer contains 70 mass % or more of the binder and the natural wax in total.

\* \* \* \* \*